(12) United States Patent
Orihashi et al.

(10) Patent No.: US 11,541,726 B2
(45) Date of Patent: Jan. 3, 2023

(54) HEAT MANAGEMENT SYSTEM FOR VEHICLE

(71) Applicants: TOYOTA JIDOSHA KABUSHIKI KAISHA, Aichi (JP); SUBARU CORPORATION, Tokyo (JP)

(72) Inventors: Manabu Orihashi, Okazaki (JP); Yoshio Hasegawa, Toyota (JP); Masaki Suzuki, Miyoshi (JP)

(73) Assignees: TOYOTA JIDOSHA KABUSHIKI KAISHA, Aichi-ken (JP); SUBARU CORPORATION, Tokyo (JP)

( * ) Notice: Subject to any disclaimer, the term of this patent is extended or adjusted under 35 U.S.C. 154(b) by 88 days.

(21) Appl. No.: 17/227,384

(22) Filed: Apr. 12, 2021

(65) Prior Publication Data

US 2021/0323381 A1 Oct. 21, 2021

(30) Foreign Application Priority Data

Apr. 17, 2020 (JP) .............................. JP2020-074015

(51) Int. Cl.
*B60H 1/32* (2006.01)
*B60H 1/00* (2006.01)
*B60K 1/00* (2006.01)

(52) U.S. Cl.
CPC ..... *B60H 1/32281* (2019.05); *B60H 1/00271* (2013.01); *B60H 1/00392* (2013.01); *B60H 1/00485* (2013.01); *B60H 1/3227* (2013.01); *B60H 2001/00307* (2013.01); *B60K 2001/006* (2013.01)

(58) Field of Classification Search
CPC ............ B60H 1/32281; B60H 1/00271; B60H 1/00392; B60H 1/00485; B60H 1/3227; B60H 2001/00307; B60K 2001/006
USPC .......................................................... 62/244
See application file for complete search history.

(56) References Cited

U.S. PATENT DOCUMENTS

2015/0217622 A1* 8/2015 Enomoto ........... B60H 1/00385
62/244
2016/0153343 A1 6/2016 Kakehashi et al.

FOREIGN PATENT DOCUMENTS

JP 2014181594 A 9/2014
JP WO2014148024 * 9/2014

* cited by examiner

*Primary Examiner* — Davis D Hwu
(74) *Attorney, Agent, or Firm* — Hauptman Ham, LLP

(57) ABSTRACT

The disclosure herein provides a heat management system for a vehicle, comprising: a first heat circuit in which first heat medium flows; a second heat circuit in which second heat medium flows; and a main heat exchanger configured to transfer heat from the second heat medium to the first heat medium. The first heat circuit comprises: a compressor; a cabin heater; a first air heat exchanger; an evaporator; a first bypass channel configured to allow the first heat medium to bypass the main heat exchanger; and a first switching valve by which one of the main heat exchanger and the evaporator is selected as a flow destination of the first heat medium flowing out from the first air heat exchanger. A single heat circuit (the first heat circuit) can achieve both heating and cooling of the air in the cabin.

4 Claims, 4 Drawing Sheets

HEAT MANAGEMENT SYSTEM FOR VEHICLE

CROSS-REFERENCE TO RELATED APPLICATION

This application claims priority to Japanese Patent Application No. 2020-074015 filed on Apr. 17, 2020, the contents of which are hereby incorporated by reference into the present application.

TECHNICAL FIELD

The technique disclosed herein relates to a heat management system for a vehicle.

BACKGROUND

Japanese Patent Application Publication No. 2014-181594 describes a heat management system mounted on a vehicle. The heat management system includes a plurality of heat circuits (an engine cooling circuit, a cooling water circuit, etc.) in which heat medium circulates. The heat management system is configured to cool an engine by the engine cooling circuit and heat air in a cabin of the vehicle by heat obtained from the engine. The cooling water circuit has a function of cooling an inverter configured to supply electric power to an electric traction motor and a function of cooling the cabin. In the heat management system of Japanese Patent Application Publication No. 2014-181594, a cabin heater is incorporated in the engine cooling circuit and a cabin cooler is incorporated in the cooling water circuit.

SUMMARY

In the technique of Japanese Patent Application Publication No. 2014-181594, the heat circuit for heating air in the cabin (the engine cooling circuit) is separated from the heat circuit for cooling air in the cabin (the cooling water circuit), thereby resulting in complication in heat medium channels for heating and cooling air in the cabin. The disclosure herein provides a heat management system for a vehicle that enables a single heat circuit to achieve both heating and cooling of air in a cabin of the vehicle and also enables heat obtained from a vehicle-mounted electric power source to be used to heat the air in the cabin.

The heat management system disclosed herein may include a first heat circuit in which first heat medium flows, a second heat circuit in which second heat medium flows, and a main heat exchanger configured to transfer heat from the second heat medium to the first heat medium.

The first heat circuit may include a compressor, a cabin heater, a first air heat exchanger, an evaporator, a first circulation channel, a first bypass channel, and a first switching valve. The first circulation channel may connect the compressor, the cabin heater, the first air heat exchanger, and the main heat exchanger in this order. The first bypass channel may be connected to the first circulation channel and be configured to allow the first heat medium to bypass the main heat exchanger to flow through the evaporator. One of the main heat exchanger and the evaporator may be selected by the first switching valve as a flow destination of the first heat medium that has passed through the first air heat exchanger. The first air heat exchanger may be configured to exchange heat between the first heat medium and outside air. The compressor may be configured to compress the first heat medium. The cabin heater may be configured to heat air in the cabin of the vehicle by the first heat medium. The evaporator may be configured to cool the air in the cabin of the vehicle by the first heat medium.

When the air in the cabin is to be heated, the high-temperature first heat medium compressed in the compressor heats the air in the cabin in the cabin heater. At this time, the first switching valve selects the main heat exchanger, thus the first heat medium does not flow through the evaporator. When the air in the cabin is to be cooled, the first switching valve selects the evaporator. The high-temperature first heat medium compressed in the compressor is cooled in the first air heat exchanger. The cooled first heat medium evaporates in the evaporator, and its temperature further decreases. The air in the cabin is cooled by the evaporator. As above, a single heat circuit (the first heat circuit) can achieve both heating and cooling of the air in the cabin.

The second heat circuit may include a power source cooler and a second circulation channel. The power source cooler may be configured to cool a power source configured to supply electric power to an electric traction motor of the vehicle. The second circulation channel may connect the power source cooler and the main heat exchanger. The second heat medium may circulate between the power source cooler and the main heat exchanger through the second circulation channel.

In the second heat circuit, the second heat medium absorbs heat from the power source. When the air in the cabin is to be heated by the first heat circuit, the first heat medium is heated in the main heat exchanger by the second heat medium. The heat of the power source can be used to heat the air in the cabin.

The first heat circuit may further include a grille shutter configured to change an opening area and a controller which control the opening area of the grille shutter. An amount of air flowing through the first air heat exchanger is adjusted by the opening area of the grille shutter.

The temperature of the first heat medium is increased by the first heat medium being compressed in the compressor. The increased-temperature first heat medium heats the air in the cabin when passing through the cabin heater. Excessive heat of the first heat medium that has passed through the cabin heater is released to the outside air in the first air heat exchanger. The controller may be configured to control the opening area of the grille shutter to maintain the temperature of the first heat medium that has passed through the cabin heater within a predetermined temperature range.

An amount of heat to be released to the outside air is adjusted by changing the opening area of the grille shutter. The temperature of the first heat medium can be maintained within a suitable range while the amount of heat required for heating is provided to the air in the cabin. The temperature of the first heat medium may also be maintained within a suitable range also by adjusting an output of the compressor. However, the use of the grille shutter instead of the compressor can reduce electric power consumption.

The second heat circuit may include a second air heat exchanger configured to exchange heat between the second heat medium and the outside air, a second bypass channel connected to the second circulation channel, and a second switching valve. The second bypass channel may be configured to allow the second heat medium to bypass the power source cooler to flow through the second air heat exchanger. One of the power source cooler and the second air heat exchanger may be selected by the second switching valve as a flow destination of the second heat medium that has passed through the main heat exchanger. When the heat of the power source cannot be used to heat the air in the cabin, the heat of the outside air can be used to heat the air in the cabin by transferring the heat of the outside air to the second heat medium through the second air heat exchanger.

Details and further improvements of the technique disclosed herein will be described in Detailed Description below.

DETAILED DESCRIPTION

Figure 1:
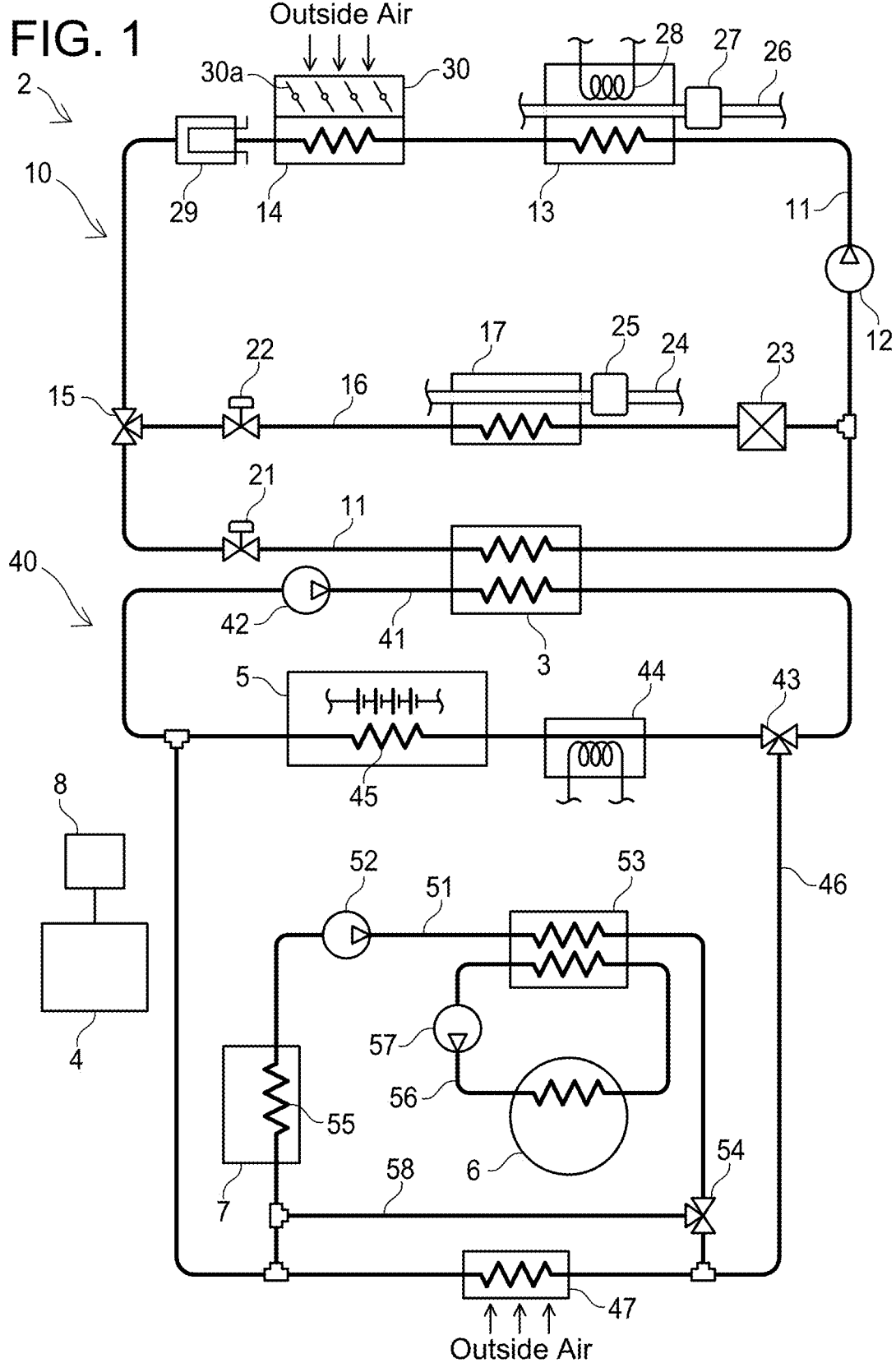
FIG. 1 is a circuit diagram of a heat management system according to an embodiment.

With reference to the drawings, a heat management system 2 according to an embodiment will be described. FIG. 1 shows a circuit diagram of the heat management system 2. The "circuit" herein means a channel circuit for heat medium.

The heat management system 2 is mounted on an electric vehicle. The heat management system 2 is configured to adjust the temperature of a cabin of the vehicle and cool a battery 5 (power source), an electric traction motor 6, and a power converter 7. Electric power of the battery 5 is converted by the power converter 7 into AC power suitable for driving the motor 6 and then is supplied to the motor 6. The battery 5 is a lithium-ion battery. The battery 5 has an output exceeding 100 volts.

The heat management system 2 includes a first heat circuit 10, a second heat circuit 40, a chiller 3, and a controller 4. The first heat circuit 10 adjusts the temperature of the cabin. The second heat circuit 40 cools the battery 5, the motor 6, and the power converter 7.

The first heat circuit 10 will be described. In the first heat circuit 10, a first circulation channel 11 connects a compressor 12, a cabin heater 13, an air-cooled condenser 14, a first switching valve 15, and the chiller 3 in this order. First heat medium flows in the first circulation channel 11. A refrigerant that has a lower boiling point than water is used for the first heat medium. An example used for the first heat medium is hydrofluorocarbons.

When the compressor 12 operates, the first heat medium circulates in the first circulation channel 11. The first heat medium is in the form of gas at a position upstream of the compressor 12. The compressor 12 compresses the gaseous first heat medium. The cabin heater 13 connected downstream of the compressor 12 is a condenser. The first heat medium that has been compressed in the compressor 12 turns into a liquid and its temperature increases. The liquefied high temperature first medium flows into the cabin heater 13.

The cabin heater 13 includes an air duct 26 through which air in the cabin flows and a fan 27 that delivers the air in the cabin to the cabin heater 13. The air in the cabin is heated by the high temperature first heat medium in the cabin heater 13. The cabin heater 13 includes a heater 28. The heater 28 is also used to heat the air in the cabin when the amount of heat provided by the first heat medium is insufficient.

The air-cooled condenser 14 is disposed downstream of the cabin heater 13. The air-cooled condenser 14 is disposed in a front portion of the electric vehicle, and outside air flows through the air-cooled condenser 14. A grille shutter 30 is disposed in front of the air-cooled condenser 14. While the vehicle is traveling, the outside air passes through the grille shutter 30 and then through the air-cooled condenser 14. In the air-cooled condenser 14, the first heat medium exchanges heat with the outside air. More specifically, excessive heat of the first heat medium is released to the outside air in the air-cooled condenser 14.

The grille shutter 30 includes a louver 30a and the angle of the louver 30a is changeable. An amount of air passing through the air-cooled condenser 14 can be adjusted by changing the angle of the louver 30a. Adjusting an amount of air passing through the grille shutter 30 will be expressed as "adjusting an opening area (or simply "an opening") of the grille shutter 30". Changing the angle of the louver 30a corresponds to adjusting the opening area of the grille shutter 30. An amount of heat to be released per unit time from the first heat medium to the outside air in the air-cooled condenser 14 can be controlled by adjusting the opening area of the grille shutter 30. The grille shutter 30 (the louver 30a) is controlled by the controller 4.

The first switching valve 15 is connected downstream of the air-cooled condenser 14, and the chiller 3 is connected downstream of the first switching valve 15. A modulator 29 is connected between the air-cooled condenser 14 and the first switching valve 15. The modulator 29 removes air bubbles from the first heat medium in the form of liquid.

A first bypass channel 16 is connected to the first circulation channel 11. One end of the first bypass channel 16 is connected, via the first switching valve 15, upstream of the chiller 3 (a medium inlet of the chiller 3). Another end of the first bypass channel 16 is connected downstream of the chiller 3 (a medium outlet of the chiller 3). An expansion valve 22, an evaporator 17, and an evaporator pressure regulator (EPR) 23 are connected to the first bypass channel 16. The first bypass channel 16 allows the first heat medium to bypass the chiller 3 to flow through the evaporator 17.

The first switching valve 15 selects one of the chiller 3 and the evaporator 17 as a flow destination of the first heat medium that has passed through the air-cooled condenser 14. An expansion valve 21 is disposed between the first switching valve 15 and the chiller 3.

When the first switching valve 15 selects the chiller 3, the first heat medium that has passed through the air-cooled condenser 14 flows through the expansion valve 21 and the chiller 3. In the expansion valve 21 and the chiller 3, the first heat medium vaporizes and its temperature decreases. A second circulation channel 41 also passes through the chiller 3. The second circulation channel 41 belongs to the second heat circuit 40. Second heat medium flows in the second circulation channel 41. In the chiller 3, the second heat medium has a higher temperature than the first heat medium, and heat is transferred from the second heat medium to the first heat medium. That is, the heat of the second heat medium is transferred to the first heat medium in the chiller 3.

When the first switching valve 15 selects the evaporator 17, the first heat medium that has passed through the air-cooled condenser 14 flows through the expansion valve 22 and the evaporator 17. In the expansion valve 22 and the evaporator 17, the first heat medium vaporizes and its temperature decreases.

The evaporator 17 includes an air duct 24 through which the air in the cabin flows and a fan 25 that delivers the air in the cabin to the evaporator 17. The air passing through the air duct 24 is cooled in the evaporator 17. That is, the cabin is cooled.

The compressor 12, the first switching valve 15, and the fans 25, 27 are controlled by the controller 4. A switch 8 is connected to the controller 4. The switch 8 is disposed in the cabin. By manipulating the switch 8, a user can select whether to heat the air in the cabin or to cool the air in the cabin.

A process executed by the controller 4 to cool the air in the cabin will be described. When air-cooling is selected with the switch 8, the controller 4 controls the first switching valve 15 to select the evaporator 17. Simultaneously, the controller 4 stops the fan 27. Since the fan 27 is stopped, the air in the cabin is not delivered to the cabin heater 13, and thus the air in the cabin is not heated. The controller 4 activates the compressor 12 and the fan 25 and fully opens the grille shutter 30 (the louver 30a). The first heat medium is compressed in the compressor 12 and its temperature is increased. The increased-temperature first heat medium is cooled by the outside air in the air-cooled condenser 14. This decreased-temperature first heat medium expands in the evaporator 17 and its temperature sharply decreases. The controller 4 operates the fan 25. The air in the cabin is passed through the evaporator 17 by the fan 25 and cooled. The cooled air returns to the cabin and cools the cabin.

A process executed by the controller 4 to heat the air in the cabin will be described. When air-heating is selected with the switch 8, the controller 4 controls the first switching valve 15 to select the chiller 3. Since the first heat medium does not flow through the evaporator 17, the air in the cabin is not cooled. The controller 4 activates the compressor 12 and the fan 27. The first heat medium compressed in the compressor 12 flows through the cabin heater 13. The air in the cabin is delivered to the cabin heater 13 by the fan 27 and heated. The heated air returns to the cabin and heats the cabin.

As described, if an amount of heat of the first heat medium is insufficient to heat the air in the cabin, the controller 4 activates the heater 28 to heat the air in the cabin.

If the amount of heat of the first heat medium is excessive to heat the air in the cabin, the excessive heat is released to the outside air in the air-cooled condenser 14. The controller 4 adjusts the opening area of the grille shutter 30 to maintain the temperature of the first heat medium within an appropriate temperature range. With the opening area of the grille shutter 30 being larger, the first heat medium is cooled by greater degree. Control over the grille shutter 30 will be described later.

The first heat medium that has passed through the air-cooled condenser 14 flows through the first switching valve 15 to the chiller 3. As described, the first heat medium is heated by the second heat medium in the chiller 3. The heat of the second heat medium is also used to heat the air in the cabin. When the air in the cabin is to be heated, the heat of the battery 5 or the heat of the outside air is transferred to the first heat medium via the second heat medium and the chiller 3, which will be described later in detail. The heat of the battery 5 or the heat of the outside air is used to heat the air in the cabin.

As described, the heat management system 2 can achieve both cooling and heating of the air in the cabin with a single heat circuit (the first heat circuit 10). Control by the controller 4 when the heat of the battery 5 or the heat of the outside air is used to heat the air in the cabin will be described later.

The second heat circuit 40 will be described. The second heat circuit 40 includes the second circulation channel 41, a pump 42, a battery cooler 45, and a heater 44. The second circulation channel 41 connects the chiller 3, the battery cooler 45, and the pump 42. When the pump 42 operates, the second heat medium circulates through the chiller 3 and the battery cooler 45. The second heat medium cools the battery 5 in the battery cooler 45. The temperature of the second heat medium increases while it passes through the battery cooler 45 and this increased-temperature second heat medium flows to the chiller 3. As described, the heat of the second heat medium may be transferred to the first heat medium in the chiller 3, as a result of which the temperature of the second heat medium decreases.

An efficiency of the battery 5 may decrease when its temperature is excessively low. When the temperature of the battery 5 is low, the heater 44 is activated to heat the second heat medium. The second heat medium of which temperature has been increased by the heater 44 heats the battery 5 while passing through the battery cooler 45. The second heat circuit 40 may heat the battery 5, but the present embodiment focuses on the second heat circuit 40 cooling the battery 5.

The second heat circuit 40 further includes a radiator 47 configured to exchange heat between the second heat medium and the outside air, a second bypass channel 46, and a second switching valve 43. The second bypass channel 46 is connected to the second circulation channel 41. One end of the second bypass channel 46 is connected, via the second switching valve 43, upstream of the battery cooler 45, while another end of the second bypass channel 46 is connected downstream of the battery cooler 45. The second switching valve 43 selects one of the battery cooler 45 and the radiator 47 as a flow destination of the second heat medium that has passed through the chiller 3.

When air-heating is selected with the switch 8 and the temperature of the battery 5 is low, the controller 4 controls the second switching valve 43 to select the radiator 47. When the pump 42 operates, the second heat medium flows through the chiller 3, the heat is transferred to the first heat medium, and thus the temperature of the second heat medium decreases. The decreased-temperature second heat medium flows through the radiator 47. The decreased-temperature second heat medium absorbs heat from the outside air in the radiator 47. The second heat medium heated by the outside air is pumped to the chiller 3 again by the pump 42 and heats the first heat medium. As above, when the temperature of the battery 5 is low, the heat of the outside air is used, via the radiator 47 and the chiller 3, to heat the air in the cabin.

The second heat circuit 40 further includes a motor circulation channel 51 configured to cool the motor 6 and the power converter 7. The second heat medium also flows in the motor circulation channel 51. One end of the motor circulation channel 51 is connected to the second bypass channel 46 at a position downstream of the radiator 47. The motor circulation channel 51 extends through a converter cooler 55 configured to cool the power converter 7, a pump 52, and an oil cooler 53 in this order. Another end of the motor circulation channel 51 is connected to the second bypass channel 46 at a position upstream of the radiator 47.

A radiator bypass channel 58 that allows the second heat medium to bypass the radiator 47 is connected to the motor circulation channel 51. The radiator bypass channel 58 is connected to the motor circulation channel 51 via a third switching valve 54 at a position upstream of the radiator 47.

An oil circulation channel 56 extends through the oil cooler 53. The oil circulation channel 56 extends through the motor 6. An oil pump 57 is connected to the oil circulation channel 56. When the oil pump 57 operates, oil circulates through the oil cooler 53 and the motor 6. The oil cools the motor 6 while passing therethrough. The oil of which temperature has increased by cooling the motor 6 is cooled by the second heat medium in the oil cooler 53. The oil cooler 53, the oil pump 57, and the oil circulation channel 56 correspond to a motor cooler configured to cool the motor 6.

The second heat medium in the motor circulation channel 51 may flow through the radiator bypass channel 58 and circulates through the converter cooler 55 and the oil cooler 53. When the temperature of the second heat medium exceeds a predetermined temperature threshold, the controller 4 controls the third switching valve 54 to select the radiator 47. Simultaneously, the controller 4 controls the second switching valve 43 to select the battery cooler 45. The second heat medium in the second circulation channel 41 circulates through the pump 42, the chiller 3, and the battery cooler 45. The second heat medium in the motor circulation channel 51 circulates through the converter cooler 55, the pump 52, the oil cooler 53, and the radiator 47. The second heat medium that has cooled the power converter 7 and the motor 6 (the oil) releases its heat and is cooled in the radiator 47.

The following description assumes a state where the third switching valve 54 selects the radiator bypass channel 58 and the motor circulation channel 51 is out of fluid communication with the radiator 47. In other words, the second heat medium that has passed through the chiller 3 flows through one of the battery cooler 45 and the radiator 47. The flow destination of the second heat medium is selected by the second switching valve 43.

The heat management system 2 includes temperature sensors configured to measure the temperature of the heat medium (the first heat medium or the second heat medium) at various places on the channels, however, these sensors are not shown in the drawings. The heat management system 2 also includes a temperature sensor configured to measure the temperature of the outside air, however, this sensor is not shown either.

As described, the heat management system 2 of FIG. 1 uses the heat of the battery 5 or the heat of the outside air to heat the air in the cabin. A process executed by the controller 4 to heat the air in the cabin will be described. When the user selects air-heating by manipulating the switch 8, the controller 4 starts an air-heating process. Since the chiller 3 is used for air-heating, the controller 4 controls the first switching valve 15 to select the chiller 3 as the flow destination of the first heat medium that has passed through the air-cooled condenser 14.

Figure 2:
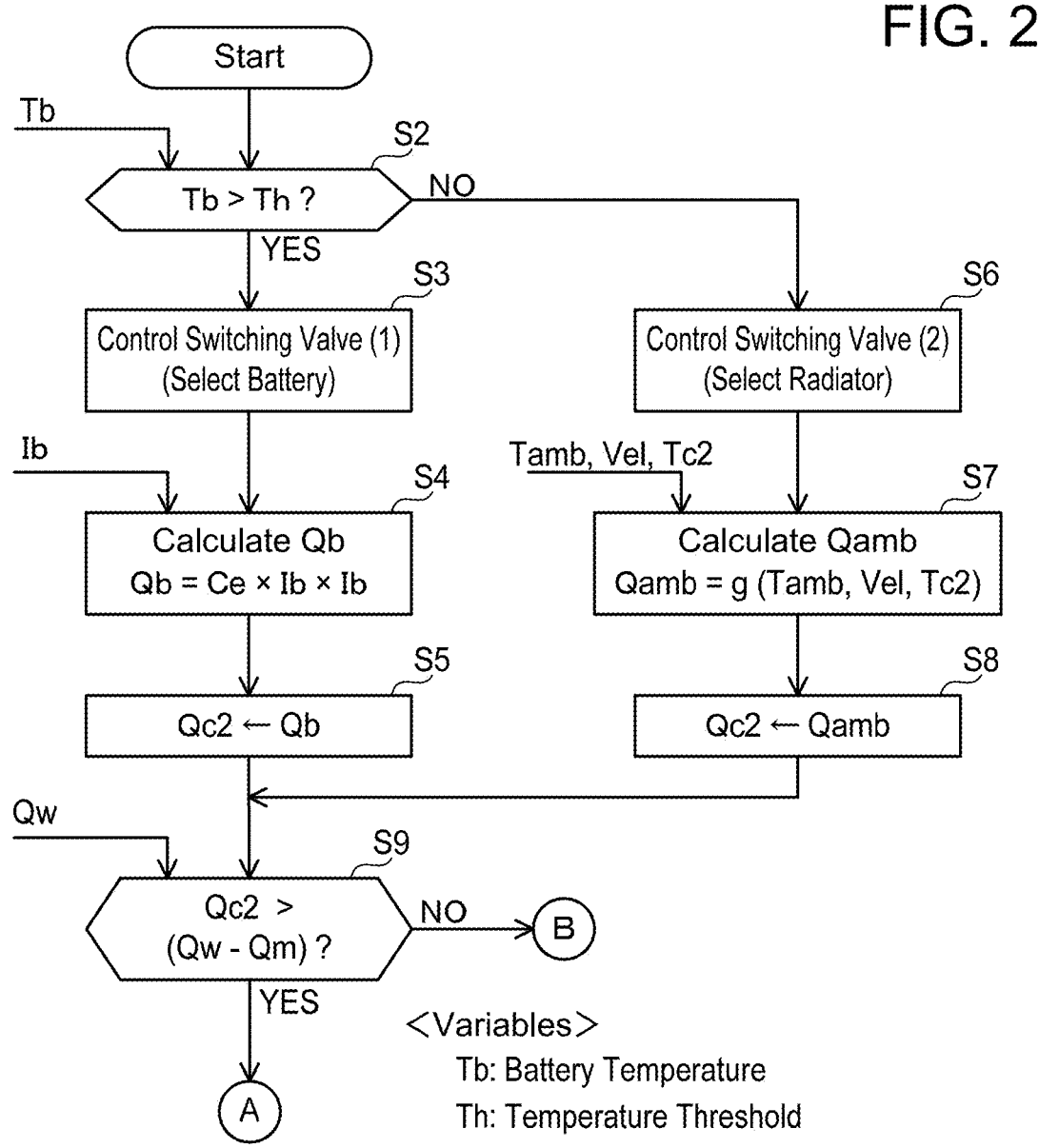
FIG. 2 is a flowchart (1) of a process executed by a controller for air-heating.
Figure 3:
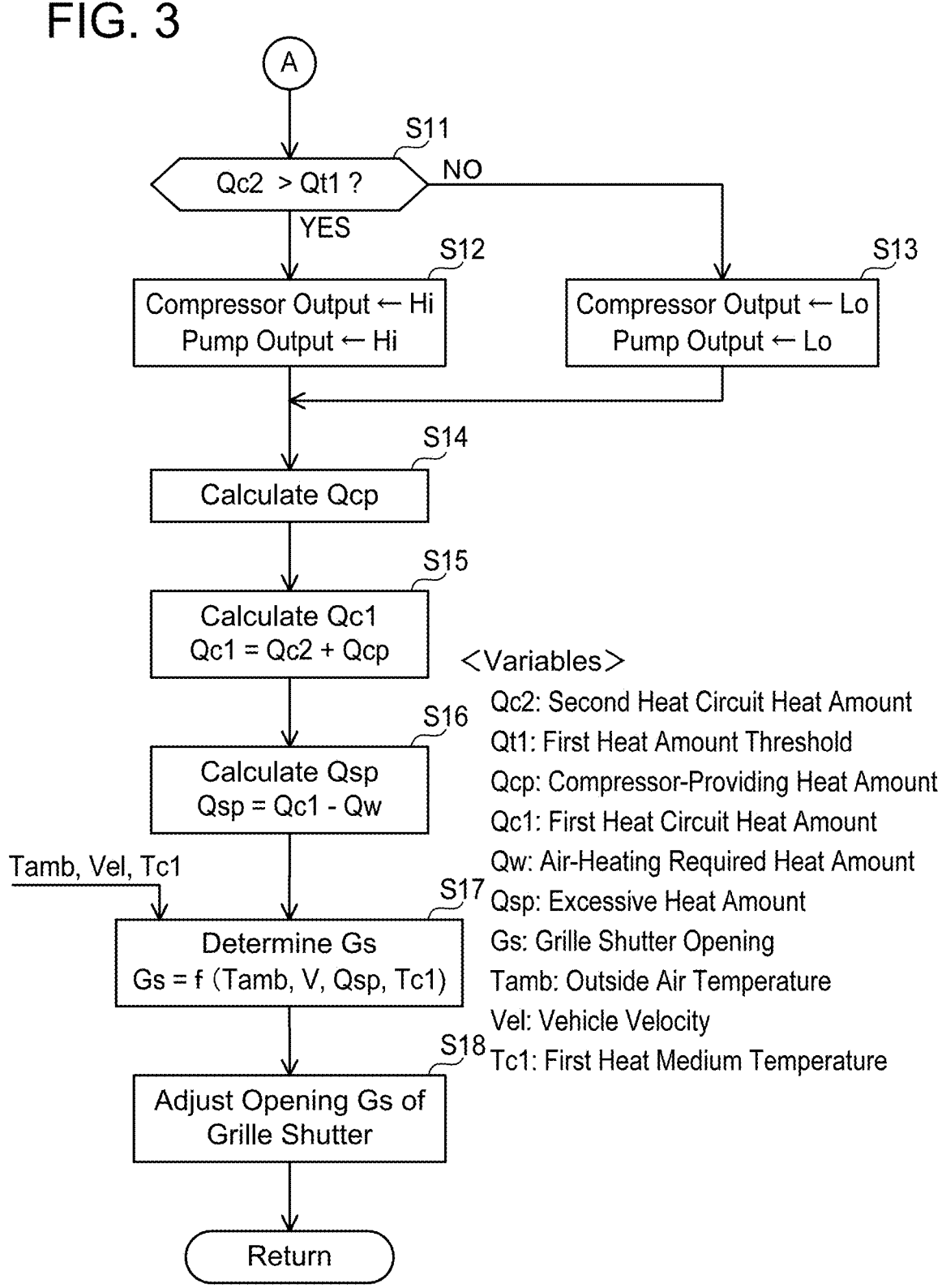
FIG. 3 is a flowchart (2) of the process executed by the controller for air-heating.
Figure 4:
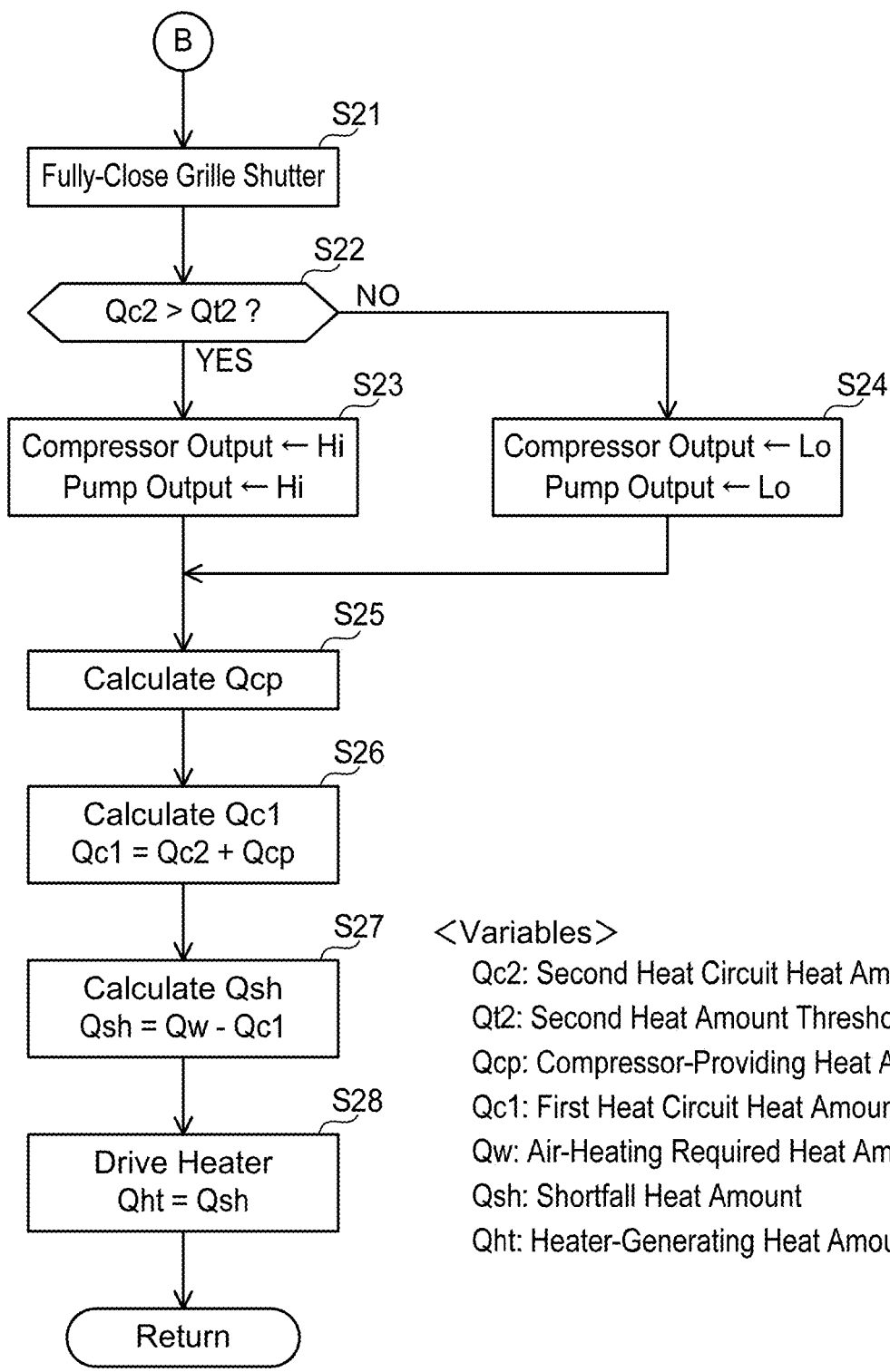
FIG. 4 is a flowchart (3) of the process executed by the controller for air-heating.

FIGS. 2 to 4 show flowcharts of the process executed by the controller 4. The controller 4 executes the process shown in FIGS. 2 to 4 repeatedly at constant cycle.

Meanings of signs (variables) used in the flowcharts are listed in the lower right portion of each of FIGS. 2 to 4. In the flowcharts, arrows pointing the rectangular (in which a process is described) from the left represent variables being inputted to the controller 4.

The controller 4 compares the temperature of the battery 5 (battery temperature Tb) with a temperature threshold Th (step S2). The battery 5 includes a temperature sensor (not shown), and this temperature sensor acquires the battery temperature Tb. The temperature threshold Th is a preset constant. If the battery temperature Tb exceeds the temperature threshold Th (step S2: YES), the heat of the battery 5 is used for air-heating. Steps S3 to S5 in FIG. 2 are executed when the heat of the battery 5 is used. If the battery temperature Tb is below the temperature threshold Th (step S2: NO), the heat of the outside air is used for air-heating. Steps S6 to S8 in FIG. 2 are executed when the heat of the outside air is used. From step S9, the same steps are executed for both the case of using the heat of the battery 5 and the case of using the heat of the outside air.

When the heat of the battery 5 is used for air-heating (step S2: YES), the controller 4 controls the second switching valve 43 of the second heat circuit 40 to select the battery 5 (step S3).

A variable "Qb" means an amount of heat generated by the battery 5. A variable "Ib" means a current of the battery 5. The current Ib usually means an output current of the battery 5, however, it means a current supplied to the battery 5 while the battery 5 is being charged. The battery-generating heat amount Qb is proportional to the square of the current Ib. A variable "Ce" means a proportionality coefficient. The controller 4 uses a mathematical expression Ce×Ib×Ib to determine the battery-generating heat amount Qb (step S4). The second heat circuit 40 shown in FIG. 1 maintains temperature of the battery 5 within an appropriate temperature range. The battery-generating heat amount Qb is therefore equal to an amount of heat that the second heat circuit 40 absorbs from the battery 5. A variable "Qc2" (second heat circuit heat amount Qc2) means the amount of heat obtained by the second heat circuit 40. When the heat of the battery 5 is used, the controller 4 assigns the battery-generating heat amount Qb to the second heat circuit heat amount Qc2 (step S5). The second heat circuit heat amount Qc2 is used in the first heat circuit 10 to heat the air in the cabin, which will be described later in detail.

When the heat of the outside air is used for air-heating (step S2: NO), the controller 4 controls the second switching valve 43 to select the radiator 47 (step S6). The second heat medium flows from the chiller 3, through the second switching valve 43, to the second bypass channel 46 and reaches the radiator 47. The second heat medium receives heat from the outside air in the radiator 47. The heat amount Qamb that the second heat medium receives from the outside air depends on an outside air temperature Tamb, a vehicle velocity Vel, and a second heat medium temperature Tc2. The second heat medium temperature Tc2 is a measured value of a temperature sensor (not shown) disposed upstream of the radiator 47. Characteristics of the radiator 47 determine a relational expression (Qamb=g (Tamb, Vel, Tc2)) between the outside air temperature Tamb, the vehicle velocity Vel, the second heat medium temperature Tc2, and the heat amount Qamb depending on these variables, and the relational expression is determined in advance. The relational expression is stored in advance in the controller 4. The controller 4 uses the relational expression to calculate the heat amount Qamb that the second heat medium obtains from the outside air in the radiator 47 (step S7).

The heat amount Qamb determined at step S7 corresponds to an amount of heat obtained from the outside air that can be used to heat the air in the cabin. When the heat of the outside air is used, the controller 4 assigns the heat amount Qamb to the second heat circuit heat amount Qc2 (step S8).

At step S5 or S8, the amount of heat that can be used to heat the air in the cabin (second heat circuit heat amount Qc2) is determined. Next, the controller 4 compares the second heat circuit heat amount Qc2 with an air-heating required heat amount Qw (step S9). More properly, the controller 4 compares the second heat circuit heat amount Qc2 with (the air-heating required heat amount Qw—a margin heat amount Qm).

The variable "Qw" means an amount of heat required for air-heating. The user can select an air-heating level with the switch 8 (FIG. 1). The air-heating level is selectable from five levels, for example. In accordance with the air-heating level selected by the user with the switch 8, the air-heating required heat amount Qw is determined. In other words, the air-heating required heat amount Qw is selected by the user.

If the second heat circuit heat amount Qc2 is larger than (the air-heating required heat amount Qw—the margin heat amount Qm) (step S9: YES), the controller 4 executes a process of FIG. 3. If the second heat circuit heat amount Qc2 is smaller than (the air-heating required heat amount Qw—the margin heat amount Qm) (step S9: NO), the controller 4 executes a process of FIG. 4. The margin heat amount Qm is a predetermined value.

In case of the second heat circuit heat amount Qc2>(the air-heating required heat amount Qw—the margin heat amount Qm), the opening Gs (opening area Gs) of the grille shutter 30 needs to be adjusted, while in case of the second heat circuit heat amount Qc2<(the air-heating required heat amount Qw—the margin heat amount Qm), the grille shutter 30 is maintained in fully-closed state, which will be described later in detail.

The process executed in case of "YES" in step 9 will be described (FIG. 3). When the second heat circuit heat amount Qc2 is larger than (the air-heating required heat amount Qw—the margin heat amount Qm), the excessive amount of heat is released in the air-cooled condenser 14. An amount of heat to be released in the air-cooled condenser 14 is adjusted by the opening of the grille shutter 30 (angle of the louver 30*a*).

A variable "Qt1" in FIG. 3 means a first heat amount threshold. The first heat amount threshold Qt1 is a threshold to determine outputs of the compressor 12 and the pump 42. If the second heat circuit heat amount Qc2 is larger than the first heat amount threshold Qt1 (step S11: YES), the controller 4 sets the output of the compressor 12 to Hi and also sets the output of the pump 42 to Hi (step S12). If the second heat circuit heat amount Qc2 is smaller than the first heat amount threshold Qt1 (step S11: NO), the controller 4 sets the output of the compressor 12 to Lo and also sets the output of the pump 42 to Lo (step S13). The output Hi is larger than the output Lo. That is, the controller 4 increases the performance of the first heat circuit 10 and the second heat circuit 40 when the second heat circuit heat amount Qc2 is relatively large.

A variable "Qcp" means an amount of heat provided from the compressor 12 to the first heat medium (compressor-providing heat amount). The compressor 12 provides energy to the first heat medium by compressing the first heat medium to turn it into liquid. This energy corresponds to the compressor-providing heat amount Qcp. The compressor-providing heat amount Qcp is determined by the output of the compressor 12 and the temperature of the first heat medium before entering the compressor 12. A temperature sensor is disposed upstream of the compressor 12 in the first circulation channel 11, and the controller 4 acquires the temperature of the first heat medium from that temperature sensor.

A relational expression between the temperature of the first heat medium, the output of the compressor 12, and the compressor-providing heat amount Qcp depending on these variables is determined and stored in the controller 4 in advance. The controller 4 calculates the compressor-providing heat amount Qcp from the output of the compressor 12 determined at step S12 or S13 and the temperature of the first heat medium upstream of the compressor 12 (step S14).

A variable "Qc1" means an amount of heat that the first heat circuit 10 can provide to the air in the cabin (first heat circuit heat amount). The first heat circuit heat amount Qc1 is represented as the sum of the amount of heat obtained from the second heat circuit 40 (the second heat circuit heat amount Qc2) and the amount of heat obtained from the compressor 12 (the compressor-providing heat amount Qcp) (step S15).

The controller 4 drives the fan 27 to deliver the air in the cabin to the cabin heater 13. The increased-temperature first heat medium that has passed through the compressor 12 passes through the cabin heater 13. In the cabin heater 13, the air-heating required heat amount Qw is transferred from the first heat medium to the air in the cabin. As such, the cabin is heated according to the air-heating level selected by the user.

A variable "Qsp" means an amount of heat (excessive heat amount) obtained by subtracting the air-heating required heat amount Qw from the first heat circuit heat amount Qc1 (step S16). Since the amount of heat provided to the air in the cabin is the air-heating required heat amount Qw, the excessive heat amount Qsp, which is obtained by subtracting the air-heating required heat amount Qw from the amount of heat of the first heat circuit 10 (the first heat circuit heat amount Qc1), needs to be released. The excessive heat amount Qsp is released to the outside air in the air-cooled condenser 14 shown in FIG. 1. The amount of air passing through the air-cooled condenser 14 depends on the opening Gs of the grille shutter 30 (angle of the louver 30*a*). The controller 4 controls the grille shutter 30 such that the amount of heat to be released in the air-cooled condenser 14 becomes equal to the excessive heat amount Qsp. The amount of heat to be released in the air-cooled condenser 14 depends on the vehicle velocity Vel, the outside air temperature Tamb, the first heat medium temperature Tc1, and the opening Gs of the grille shutter 30. A relation among these variables is stored in advance in the controller 4. By using the relation, the controller 4 determines the opening Gs of the grille shutter 30 from the outside air temperature Tamb, the vehicle velocity Vel, the first heat medium temperature Tc1, and the target amount of heat to be released (i.e., the excessive heat amount Qsp) (step S17). A temperature sensor is disposed upstream of the air-cooled condenser 14, and the first heat medium temperature Tc1 used at step S17 is measured by that temperature sensor.

The controller 4 controls the grille shutter 30 (the louver 30*a*) such that the determined opening Gs is achieved (step S18).

When the battery-generating heat amount Qb or the heat of the outside air is used for air-heating, the controller 4 determines the outputs of the compressor 12 and the pump 42 at step S12 or S13, and then adjusts the opening Gs of the grille shutter 30 to release the excessive heat amount Qsp (steps S14 to S18). The controller 4 repeatedly executes the processes of FIGS. 2 to 4 at constant cycle (the process of FIG. 4 will be described later). The controller 4 adjusts the opening Gs of the grille shutter 30 in accordance with changes in the vehicle velocity Vel, the outside air temperature Tamb, and the first heat medium temperature Tc1.

The heat management system 2 according to the embodiment adjusts the amount of heat to be released to the outside air (the excessive heat amount Qsp) by changing the opening of the grille shutter 30. By adjusting the opening of the grille shutter 30, the heat management system 2 can maintain the temperature of the first heat medium within an appropriate range while providing the air-heating required heat amount Qw to the air in the cabin. The heat management system 2 can maintain the temperature of the first heat medium within an appropriate range by adjusting the output of the compressor instead of by adjusting the opening of the grille shutter. However, adjusting the output of the compressor requires much electric power than adjusting the opening of the grille shutter 30 does. Using the grille shutter can reduce electric power consumption.

The process executed in case of "NO" at step S9 in FIG. 2 will be described (FIG. 4). When the second heat circuit heat amount Qc2 is smaller than (the air-heating required heat amount Qw—the margin heat amount Qm), the second heat circuit heat amount Qc2 and the heat amount Qcp (the amount of heat provided from the compressor 12 to the first heat medium) do not amount to the air-heating required heat amount Qw. The process of FIG. 4 is executed for such a case.

Firstly, the controller 4 fully closes the grille shutter 30 (step S21). The grille shutter 30 being fully closed minimizes the amount of heat to be released in the air-cooled condenser 14.

A variable "Qt2" at step S22 means a second heat amount threshold. Like the first heat amount threshold Qt1, the second heat amount threshold Qt2 is a threshold to determine outputs of the compressor 12 and the pump 42. The second heat amount threshold Qt2 is smaller than the first heat amount threshold Qt1. If the second heat circuit heat amount Qc2 is larger than the second heat amount threshold Qt2 (step S22: YES), the controller 4 sets the output of the compressor 12 to Hi and also sets the output of the pump 42 to Hi (step S23). If the second heat circuit heat amount Qc2 is smaller than the second heat amount threshold Qt2 (step S22: NO), the controller 4 sets the output of the compressor 12 to Lo and also sets the output of the pump 42 to Lo (step S24). As in step S12 in FIG. 3, when the second heat circuit heat amount Qc2 is relatively large, the controller 4 increases the performance of the first heat circuit 10 and the second heat circuit 40.

Next, the controller 4 calculates the compressor-providing heat amount Qcp (step S25) and calculates the amount of heat that the first heat circuit 10 can use (the first heat circuit heat amount Qc1) (step S26). Steps S25 and S26 are the same as steps S14 and S15, respectively.

The process of FIG. 4 is executed when the first heat circuit heat amount Qc1 is small and does not amount to the air-heating required heat amount Qw. In this case, the heater 28 (see FIG. 1) is additionally used to heat the air in the cabin.

A variable "Qsh" at step S27 means a shortfall of the first heat circuit heat amount Qc1. The shortfall heat amount Qsh corresponds to a value obtained by subtracting the first heat circuit heat amount Qc1 from the air-heating required heat amount Qw (step S27). The controller 4 drives the fan 27 and also drives the heater 28 (see FIG. 1) such that the shortfall heat amount Qsh is transferred from the heater 28 to the air in the cabin (step S28). A variable "Qht" at step S28 means an amount of heat generated by the heater 28. The controller 4 controls the heater 28 at step S28 such that the heat amount Qht generated by the heater 28 becomes equal to the shortfall heat amount Qsh. In the cabin heater 13, the heat amount Qc1 is provided from the first heat medium to the air in the cabin, and the heat amount Qht (=Qsh) is provided from the heater 28 to the cabin in the air. In total, the air-heating required heat amount Qw (=Qc1+Qsh) is provided to the air in the cabin, thus the cabin is heated at the air-heating level selected by the user.

Points to be noted relating to the technique described in the embodiment will be listed. The chiller 3 corresponds to an example of the main heat exchanger. The air-cooled condenser 14 corresponds to an example of the first air heat exchanger. The battery 5 corresponds to an example of the power source. The power source may be a fuel cell. The radiator 47 corresponds to an example of the second air heat exchanger. In the heat management system 2 according to the embodiment, each of the output of the compressor 12 and the output of the pump 42 is selectable from two levels. Each of the output of the compressor 12 and the output of the pump 42 may be selectable from three or more levels.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A heat management system for a vehicle, comprising:
   a first heat circuit in which first heat medium flows;
   a second heat circuit in which second heat medium flows; and
   a main heat exchanger configured to transfer heat from the second heat medium to the first heat medium,
   wherein the first heat circuit comprises:
      a compressor configured to compress the first heat medium;
      a cabin heater configured to heat air in a cabin of the vehicle by the first heat medium;
      a first air heat exchanger configured to exchange heat between the first heat medium and outside air;
      an evaporator configured to cool the air in the cabin of the vehicle by the first heat medium;
      a first circulation channel in which the first heat medium circulates, the first circulation channel extending through the compressor, the cabin heater, the first air heat exchanger, and the main heat exchanger in this order;
      a first bypass channel connected to the first circulation channel, the first bypass channel configured to allow the first heat medium to bypass the main heat exchanger to flow from the first air heat exchanger through the evaporator; and
      a first switching valve by which one of the main heat exchanger and the evaporator is selected as a flow destination of the first heat medium flowing out from the first air heat exchanger,
   the second heat circuit comprises:
      a power source cooler configured to cool a power source configured to supply electric power to an electric traction motor of the vehicle; and
      a second circulation channel in which the second heat medium circulates, the second circulation channel extending through the power source cooler and the main heat exchanger.

2. The heat management system of claim 1, wherein the first heat circuit further comprises:
   a grille shutter configured to change a flow rate of air flowing through the first air heat exchanger; and
   a controller configured to control an opening of the grille shutter to maintain a temperature of the first heat medium that has passed through the cabin heater within a predetermined temperature range.

3. The heat management system of claim 1, wherein the second heat circuit further comprises:
- a second air heat exchanger configured to exchange heat between the second heat medium and the outside air;
- a second bypass channel connected to the second circulation channel, the second bypass channel configured to allow the second heat medium to bypass the power source cooler to flow through the second air heat exchanger; and
- a second switching valve by which one of the power source cooler and the second air heat exchanger is selected as a flow destination of the second heat medium flowing out from the main heat exchanger.

4. The heat management system of claim 3, wherein the second heat circuit further comprises:
- a motor cooler configured to cool the electric traction motor;
- a motor circulation channel connected to the second bypass channel at an inlet and an outlet of the second air heat exchanger, the motor circulation channel configured to circulate the second heat medium between the motor cooler and the second air heat exchanger; and
- a third bypass channel connected to the motor circulation channel, the third bypass channel configured to allow the second heat medium that has passed through the motor cooler to bypass the second air heat exchanger.

\* \* \* \* \*